United States Patent [19]

Krupp et al.

[11] 4,083,762

[45] Apr. 11, 1978

[54] CONTROL OF STAINING IN ELECTRODEPOSITION OF COATINGS

[75] Inventors: Myron J. Krupp, Grafton; Gerald R. Gacesa; John P. Knudtson, both of Franklin, all of Wis.

[73] Assignee: PPG Industries, Inc., Pittsburgh, Pa.

[21] Appl. No.: 462,269

[22] Filed: Apr. 19, 1974

Related U.S. Application Data

[63] Continuation of Ser. No. 855,749, Sep. 5, 1969, abandoned.

[51] Int. Cl.$^2$ ............................................. C25D 13/10
[52] U.S. Cl. ................................................. 204/181 R
[58] Field of Search ......................................... 204/181

[56] References Cited

U.S. PATENT DOCUMENTS

| | | | |
|---|---|---|---|
| 3,380,927 | 4/1968 | Edelstein et al. | 252/308 |
| 3,493,482 | 2/1970 | Irwin | 204/181 |
| 3,634,348 | 1/1972 | Carter | 260/18 EP |

*Primary Examiner*—Howard S. Williams
*Attorney, Agent, or Firm*—William J. Uhl

[57] ABSTRACT

This invention relates to novel stain-resistant electrodepositable compositions. It has been found that electrodepositable resins, and especially those resins which are mixed fatty acid partial esters of high molecular weight polyols have a tendency to develop a stain when electrodeposited over an iron-containing substrate. This staining problem is eliminated or greatly reduced by use of a complex organic polyphosphoric ester acid anhydride.

7 Claims, No Drawings

CONTROL OF STAINING IN ELECTRODEPOSITION OF COATINGS

This is a continuation of application Ser. No. 855,749, filed September 5, 1969, now abandoned.

STATE OF THE PRIOR ART

Electrodeposition has achieved wide industrial acceptance as a method of applying protective coatings. The coatings achieved have excellent properties and for many applications electrodeposition results in a coating which does not run or wash off during baking. Virtually any conductive substrate can be coated by electrodeposition. The most commonly employed substrates include the base metals, such as iron, steel, aluminum, copper, zinc, brass, tin, nickel and chromium, as well as other metals and pretreated metals. Impregnated paper or other substrates rendered conductive under the conditions employed may also be coated. Electrodeposition of various materials, including waxes, natural and synthetic resins have been held in the art for some time. Likewise, a recent U.S. Pat. No. 3,230,162, as well as other relatively recent U.S. Patents, as well as other patents and publications, describe the methods and compositions presently utilized in the field of automotive finishing and industrial coatings.

While electrodeposition in many respects is advantageous compared to ordinary application methods, problems have arisen in the fact that when vehicle resins are deposited over an iron-containing substrate, there is a tendency for a stain to be formed upon the electrodeposited film, which in many cases renders the film unsuitable for coating materials in which a uniform color is desired. This is especially offensive where the electrodeposited coating serves as a one-coat finish which must be decorative as well as protective. This problem is especially apparent after several tank turnovers or when the electrodeposition bath is allowed to equilibriate with air. The problem is particularly noted in those electrodepositable compositions which are described in U.S. application Ser. No. 568,144, filed July 27, 1966, which application is hereby incorporated by reference. These resin esters comprise mixed esters of a fatty acid and an unsaturated fatty acid adduct. Certain of the esters which may be utilized in these compositions are described in Belgian Pat. No. 641,642, as well as U.S. Pat. No. 3,308,077.

DESCRIPTION OF THE INVENTION

It has now been found that by incorporating into these electrodepositable compositions a complex organic polyphosphoric ester acid anhydride staining is eliminated or greatly reduced.

The phosphorus ester utilized in the compositions of the invention is an orthophosphate or polyphosphate ester of conjointly an aliphatic alcohol and a non-ionic adduct of ethylene oxide and reactive hydrogen-containing organic compounds. In the embodiment of greatest effectiveness these phosphate co-esters are acidic, that is, less than all of the protons supplied by the phosphorylating agent are taken up in the conjoint esterification with alcohol and non-ionic adduct so as to give a final product of very low pH when dispersed in aqueous medium.

In forming the co-esters there is used either orthophosphate or polyphosphate acids or anhydrides to conjointly esterify and link through a phosphate bridge the aliphatic alcohols and non-ionic adducts. For example, orthophosphoric acid or its anhydride phosphorous pentoxide may be employed. In addition, the homologous series of straight chains of interlinked orthophosphate groups represented by polyphosphates, for example, pyrophosphoric acid and tripolyphosphoric acid can be used. There is achieved good results with a commercially available material containing about 105 percent of polyphosphoric acid.

As the aliphatic alcohol which is to be esterified in accordance with the invention, there is used any $C_6$–$C_{16}$ monohydric aliphatic alcohol, examples of which are any primary or secondary hexyl alcohol, 2-ethylhexyl alcohol, isooctyl alcohol, isodecyl alcohol, dodecyl alcohol, nonyl alcohol, hexadecyl alcohol, and mixtures thereof. Excellent results may also be achieved with the so-called "oxo-process" alcohols made by the catalytic addition of carbon monoxide and hydrogen to monoethylenically unsaturated olefins and comprising mixtures of predominantly straight chain primary alcohols in the $C_6$–$C_{13}$ range, or mixtures of isomers of a single alcohol such as iso-octyl alcohol and some of the others named specifically hereinabove.

As noted previously, the phosphate co-esters of the invention include as a reacted component a non-ionic compound which is an adduct of ethylene oxide and an organic compound containing reactive hydrogen atoms. Such reactive hydrogens may be derived from hydroxy, carboxylic, amino or mercapto groups and thus many different organic compounds may be used for forming the adduct. For example, alkylated phenols substituted with one or more alkyl groups of 6 to 18 carbon atoms may be used, specifically, hexyl phenol, octyl phenol, dinonyl phenol, dodecyl phenol, and mono- and dihexadecyl phenols. Aliphatic alcohols having 6 to 25 carbon atoms such as hexyl alcohol, octyl alcohol, decyl alcohol, oleyl alcohol, stearyl alcohol, cetyl alcohol, palmityl alcohol, and abietyl alcohol may be used. Another class of organic compounds containing reactive hydrogen atoms which may be employed for making nonionic adducts with ethylene oxide are aliphatic monocarboxylic acids having 6 to 20 carbon atoms per molecule. Examples are hexanoic acid, octanoic acid, lauric acid, palmitic acid, stearic acid and rosin and its component abietic acid. In addition, partial esters of any of said carboxylic acids with polyhydric alcohols containing 2 to 6 hydroxy groups may be employed. Examples of such polyhydroxy compounds are ethylene, propylene, butylene, and hexylene glycols, glycerine, pentaerythritol, sorbitol and mannitol. Still another class of reactive hydrogen-containing compounds which may be reacted with ethylene oxide to form non-ionic adducts of utility in the invention are primary amines of 6 to 20 carbon atoms, examples of which are hexyl amine, octyl amine, nonyl amine, decyl amine, dodecyl amine and hexadecyl amine as well as di- and tri-amines of the same number of carbon atoms, e.g., ethylene diamine, diethylene triamine, etc. Finally, ethylene oxide adducts of alkyl mercaptans containing 6 to 20 carbons such as hexyl, octyl, nonyl, decyl, dodecyl and hexadecyl mercaptans may also be used.

The weight proportions of the $C_6$–$C_{16}$ monohydric aliphatic alcohol and the non-ionic adduct may vary within the range of about 5 to 85 parts of the non-ionic adduct per 100 parts total of the mixture of the alcohol and the adduct. Ordinarily, about 5 to 75 parts of the non-ionic adduct per 100 parts total of the mixture of the adduct and the $C_6$–$C_{16}$ monohydric alcohol are used. The total number of mols combined of the $C_6$–$C_{16}$ monohydric alcohol and of the non-ionic adduct to the total number of mols of phosphorylating agent, calculated as phosphorous pentoxide ($P_2O_5$), is within the range from about 1:1 to about 5:1.

These esters and their method of manufacture are set forth in U.S. Pat. No. 3,380,927, which is hereby incorporated by reference.

In the electrodeposition process, the articles to be electrocoated are immersed in an aqueous dispersion of a solubilized, ionized, film-forming material such as a synthetic organic vehicle resin. An electric current is passed between the article to be coated, serving as an electrode, and a counter-electrode to cause deposition of a coating of the vehicle resin on the articles. The articles are then withdrawn from the bath, usually rinsed and then the coating either air-dried or baked in the manner of a conventional finish.

A number of electrodepositable resins are known and can be employed to provide the electrodepositable compositions which may be treated by the process of this invention. Virtually any water-soluble, water-dispersible or water-emulsifiable polyacid or polybasic resinous material can be electrodeposited and, if film-forming, provides coatings which may be suitable for certain purposes. Any such electrodepositable composition is included among those which can be employed in the present invention, even though the coating obtained might not be entirely satisfactory for certain specialized uses.

Presently, the most widely used electrodeposition vehicle resins are synthetic polycarboxylic acid resinous materials which include a reaction product or adduct of the drying oil or semi-drying oil fatty acid ester with a dicarboxylic acid or anhydride. Preferably, the drying oil or semi-drying oil per se is employed. Generally, drying oils are those oils which have an iodine value of above about 130, and the semi-drying oils are those which have an iodine value of about 90 to 130, as determined by Method ASTM-D1467-57T.

Also included among such esters are those in which the esters themselves are modified with other acids, including saturated, unsaturated or aromatic acids such as butyric acid, stearic acid, linoleic acid, phthalic acid, isophthalic acid, terephthalic acid or benzoic acid, or an anhydride of such an acid. One inexpensive acid material which has been found to produce good results in many instances is rosin, which is composed of chiefly abiotic acid and other resin acids. The acid-modified esters are made by transesterification of the ester, as by forming a di- or monoglyceride by alcoholysis, followed by esterification with the acid. They may also be obtained by reacting oil acids with a polyol and reacting the acid with the partial ester. In addition to glycerol, alcoholysis can be carried out using other polyols such as trimethylolpropane, pentaerythritol, sorbitol and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols, are also useful.

Also included within the terms "drying oil fatty acid esters" as set forth herein are alkyd resins prepared utilizing semi-drying or drying oils; esters of epoxides with such fatty acids, including esters of diglycidyl ethers of polyhydric compounds as well as other mono-, di- and polyepoxides, semi-drying or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha, beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxlic acids which form anhydrides, for example, maleic acid or itaconic acid. Fumaric acid, which does not form an anhydride, may also be utilized. Generally speaking, the anhydride or acid employed contains 4 to 12 carbon atoms, although longer chain compounds can be used if so desired.

The reaction between the acid or acid anhydride and the drying oil or semi-drying oil fatty acid ester takes place readily without the use of a catalyst and at temperatures in the range of about 100° C. to about 300° C. or higher, with the reaction generally being carried out between about 200° C. and about 250° C.

While the reaction produces can be comprised solely of adducts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion and which may have other similar desirable characteristics. For this purpose, any copolymerizable ethylenically unsaturated monomer can be employed.

The preferred class of monomers can be described by the formula:

(I)

where $R_1$ and $R_2$ are hydrogen or alkyl, $R_4$ is hydrogen, alkyl or carboxyalkyl and $R_5$ is cyano, aryl, alkyl, alkenyl, aralkyl, alkaryl, alkoxycarbonyl or aryloxycarbonyl. The preferred compounds are styrene, substituted styrenes, alkyl acrylates, alkyl methacrylates, diolefins, and acrylonitrile.

The reaction of the fatty acid ester, the acid or anhydride or any additional monomer or monomers can be carried out concurrently, that is, with each of the components of the reaction product being mixed together and heated to reaction temperature. However, because the monomer and the acid or anhydride are often quite reactive with each other, the oil or other fatty acid ester is preferably first reacted with the acid or acid anhydride, and then this product is subsequently reacted with any ethylenically unsaturated monomer or monomers employed. When the process is carried out in this manner, the reaction of the additional monomer with the initial reaction product is usually carried out at somewhat lower temperatures, usually between about 25° C. and 200° C.

Neutralization of these products is accomplished by reaction of all or part of the dicarboxylic anhydride groups with a base, usually an amine. Usually up to about half of such groups are neutralized in unesterified adducts; the partially esterified product are often neutralized to a greater extent, based on unesterified acid groups remaining.

It is preferred in certain instances that the neutralization reaction be carried out in such a manner that amido groups are attached to part of the carbonyl carbon atoms derived from the dicarboxylic acid or anhydride.

Amido groups are formed, for example, when the reaction with the neutralizing base is carried out with a water solution of ammonia, a primary amine or a secondary amine, or when the product is reacted with such an amine in the absence of water.

Compositions within this general class are described in U.S. Pat. Nos. 3,366,563 and 3,369,983.

Another vehicle comprises the fatty acid ester, unsaturated acid or anhydride reaction products and any additional unsaturated modifying materials (as described above) which are further reacted with the polyol.

Essentially any polyol can be employed, but diols are preferred. When higher polyols, such as trimethylol propane, glycerol, pentaerythritol and the like are utilized, they are employed in small amounts, or in conjunction with the diol, or in the presence of a monohydric alcohol, and are used with adducts having a relatively low proportion of acidic component. The various diols that can be employed include, for example, ethylene glycol; 1,2-propylene glycol; 1,4-butanediol; 1,5-pentanediol; 2-methyl-2-n-propyl-1,3-propanediol; and similar higher or substituted alkylene glycols, containing up to about 20 carbon atoms or more. Glycol ethers may also be employed, such as diethylene glycol, triethylene glycol, poly(oxytetramethylene)glycols, and the like, those having molecular weights of up to about 400 being most useful. Water-insoluble diols are often preferable, and especially desirable water-dispersed compositions for electrodeposition are obtained using 2,2-bis(4-hydroxycyclohexyl)propane (which has given the best results), neopentyl glycol, 1,1'-isopropylidene-bis(p-phenyleneoxy)di-2-propanol, and similar diols.

In most instances, the reaction products herein are made from about 65 percent to about 98 percent of ester-anhydride adduct and about 2 percent to about 35 percent of a diol, these percentages being by weight.

In many instances, only part of the anhydride groups of the adduct, elg., about 10 percent, are reacted with the polyol. Of those anhydride groups reacted, it is preferred that only one of the carboxyl groups is esterified in each instance. While it is not necessary that each anhydride form the half-ester and some of the dicarboxylic groups may be fully esterified, in actual practice the half-esters of the dicarboxylic acid moieties are usually obtained.

The polyol reaction products are more fully described in Application Ser. No. 450,205, filed Apr. 22, 1965.

Another type of electrodepositable coating composition which gives desirable results are the water-dispersible coating compositions comprising at least partially neutralized interpolymers of hydroxyalkyl esters of unsaturated carboxylic acids, unsaturated carboxylic acids and at least one other ethylenically unsaturated monomer. These are employed in the composition along with an amine-aldehyde condensation product, with the interpolymer usually making from about 50 percent to about 95 percent by weight of the resinous composition.

The acid monomer of the interpolymer is usually arcylic acid or methacrylic acid, but other ethylenically unsaturated monocarboxylic and dicarboxylic acids, such as ethacrylic acid, crotonic acid, maleic acid, or other acids of up to about 6 carbon atoms can also be employed. The hydroxyalkyl ester is usually hydroxyethyl or hydroxypropyl acrylate or methacrylate, but also desirable are the various hydroxyalkyl esters of the above acids having, for example, up to about 5 carbon atoms in the hydroxyalkyl radical. Mono- or diesters of the dicarboxylic acids mentioned are included. Ordinarily, the acid and ester each comprise between about one percent and about 20 percent by weight of the inter polymer, with the remainder being made up of one or more other copolymerizable ethylenically unsaturated monomers. The most often used are the alkyl acrylates, such as ethyl acrylate; the alkyl methacrylates, such as methyl methacrylate; and the vinyl aromatic hydrocarbons, such as styrene, but others can be utilized.

The above interpolymer is at least partially neutralized by reaction with a base as described above; at least about 10 percent and preferably 50 percent or more of the acidic groups are neutralized, and this can be carried out either before or after the incorporation of the interpolymer in the coating composition.

The amine-aldehyde condensation products included in these compositions are, for example, condensation products of melamine, benzoguanmine, or urea with formaldehyde, although other amine-containing amines and amides, including triazines, diazines, triazoles, guanadines, guanamines and alkyl and aryl-substituted derivatives of such compounds can be employed, as can other aldehydes, such as acetaldehyde. The alkylol groups of the products can be etherified by reaction with an alcohol, and the products utilized can be water-soluble or organic solvent soluble.

Electrodeposition compositions comprising the above interpolymers and an amine-aldehyde resin are more fully described in U.S. Pat. No. 3,403,088.

Still another electrodepositable composition of desirable properties comprises an alkyl-amine vehicle, that is, a vehicle containing an alkyd resin and an amine-aldehyde resin. A number of these are known in the art and may be employed. Preferred are water-dispersible alkyds such as those in which a conventional alkyd (such as a glyceryl phthalate resin), which may be modified with drying oil fatty acids, is made with a high acid number (e.g., 50 to 70) and solubilized with ammonia or an amine, or those in which a surface-active agent, such as a polyalkylene glycol (e.g., "Carbowax") is incorporated. High acid number alkyds are also made by employing a tricarboxylic acid, such as trimellitic acid or anhydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis(methoxymethyl)melamine.

The alkyd-amine compositions are dispersed in water and they ordinarily contain from about 10 percent to about 50 percent by weight of amine resin based on the total resinous components.

Yet another electrodepositable composition of desirable properties comprises mixed esters of a resinous polyol. These resin esters comprise mixed esters of an unsaturated fatty acid adduct. Generally the polyols which are utilized with these resins are essentially any polyol having a molecular weight between about 500 and about 5000. Such resinous polyols include those resinous materials containing oxirane rings which can be opened in, prior to, or during the esterification reaction to provide an apparent hydroxy site. The vehicle resins are formed by reacting a portion of the hydroxyl groups of the polyol with the fatty acid, the ratio of the reactions being such that at least an average of one hydroxyl group per molecule of the polyol remains unreacted. The remaining functionality is then reacted with the unsaturated fatty acid adduct of an olefinically unsaturated dicarboxylic anhydride, such as maleic anhydride, this second esterification reaction being conducted under conditions so that esterification occurs through the anhydride ring, thereby introducing free acid groups into the molecule. Mixed acids of the class described are disclosed in Belgian Pat. No. 641,642, as well as in copending application Ser. No. 568,144, filed July 27, 1966.

In order to produce an electrodepositable composition, it is necessary to at least partially neutralize the acid groups present with a base in order to disperse the resin in the electrodeposition bath. Inorganic bases such as metal hydroxides, especially potassium hydroxide, can be used.

There may likewise be used ammonia or organic bases, especially water-soluble amines, such as, for example, the mono-, di- and tri-lower alkyl amines such as methylamine, ethylamine, propylamine, butylamine, dimethylamine, diethylamine, dipropylamine, dibutylamine, m-methyl-butylamine, triethylamine, tributylamine, methyldiethylamine, dimethylbutylamine and the like; cyclic amines such as morpholine, pyrrolidine, piperidine; diamines such as hydrazine, methylhydrazine, 2,3-toluene diamine, ethyl diamine and piperizine and substituted amines such as hydroxylamine, ethanolamine, diethanolamine, butanolamine, hexanolamine and methyldiethanolamine, octanolamine, diglycolamine and other polyglycol amine, triethanolamine and methylethanolamine, n-amino-ethanolamine and methyldiethanolamine and polyamines such as diethylene triamine, triethylene tetramine, hexamethylene tetramine.

There may be present in the electrodepositable composition any of the types of pigments employed in the art, for example, iron oxide, lead silico chromate, strontium chromate, carbon black, titanium dioxide, talc, barium sulfate, and the like, as well as combinations of these and similar pigments. Color pigments such as cadmium yellow, cadmium red, phthalocyanine blue, chrome yellow, toluidine red, hydrated iron oxide, and the like, may be included if desired. There is often incorporated into the pigment composition a dispersing or surface-active agent. If such a surface-active agent is used, it should be the non-ionic or anionic type in the case of polyacid vehicles or a combination of these types. In the case of polybasic resins, non-ionic or cationic agents are preferred. Usually the pigment and surface-active agent, if any, are ground together in a portion of the vehicle, or alone to make a paste and this is blended with the vehicle to produce a coating composition.

In many instances, it is preferred to add to the bath in order to aid dispersibility, viscosity and/or film quality, a non-ionic modifier or solvent. Examples of such materials are aliphatic naphthenic and aromatic hydrocarbons or mixtures of the same; mono- and dialkyl ethers of glycols, pine oil and other solvents compatible with the resin system. The presently preferred modifier is 4-methoxy-4-methyl pentanone-2 (Pent-Oxone).

There may also be included in the coating composition, if desired, additives such as antioxidants, for example, orthoamylphenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines or amides, esters of sodium isothionates, alkyl phenoxypolyethylene alkanols, or phosphate esters including ethoxylated alkylphenol phosphates. Other additives which may be employed include anti-foaming agents, suspending agents, bactericides, and the like.

In formulating the coating composition, ordinary tap water may be employed. However, such water may contain a relatively high level of metals and cations which, while not rendering the process inoperative, may result in variations of properties of the baths when used in electrodeposition. Thus, in common practice, deionized water, i.e., water from which free ions have been removed by the passage through ion exchange resins, is invariably used to make up coating compositions of the instant invention.

In addition to the electrodepositable vehicle resins described above, there may be present in the electrodepositable composition other resinous materials which are non-carboxylic acid materials. For example, there may be added up to about 50 percent by weight of a amine-aldehyde condensation product. Examples of such amine-aldehyde condensation products employed are aldehyde condensation products of melamine, urea, acetoguanamine or a similar compound and may be water-soluble or organic solvent-soluble. Generally the aldehyde employed is formaldehyde, although useful products can be made from other aldehydes such as acetaldehyde, crotonaldehyde, acrolein, benzaldehyde, furfural and others. Condensation products of melamine or urea are the most common and preferred, but products of other amines and amides in which at least one amido group is present can be employed.

For example, such condensation products can be produced with triazines, diazines, triazoles, guanadines, guanamines, and alkyl and aryl-substituted derivatives of such compounds, including alkyl-substituted and aryl-substituted cyclic ureas, and alkyl- and aryl-substituted melamines. Examples of such compounds are: N,N'-dimethyl urea, benzyl urea, N,N'-ethylene urea, diazine diamine, formaguanamine, benzoguanamine, ammeline, 2-chloro-4,6-diamino-1,3,5-triazine, 3,5-diaminotriazole, 4,6-diaminopyrrimidine, 2,4,6-triphenyltriamine-3,5-triazine, and the like.

These aldehyde condensation products contain methylol groups or similar alkylol groups, depending upon the particular aldehyde employed. If desired, these methylol groups can be etherified by reaction with an alcohol. Various alcohols are employed for this purpose, including essentially any monohydric alcohol, although the preferred alcohols are methanol, butanol, and similar lower alkanols.

The amine-aldehyde condensation products are produced in a manner well-known in the art, using acidic or basic catalysts and varying conditions of time and temperature. The aldehyde is often employed as a solution in water or alcohol, and the condensation, polymerization and etherification reactions may be carried out either sequentially or simultaneously.

Other base-solubilized polyacids which may be employed as electrodeposition vehicles include those taught in U.S. Pat. No. 3,382,165, which is incorporated herein by reference, wherein the acid groups rather than being solely polycarboxylic acid groups contain mineral acid groups such as phosphonic, sulfonic, sulfate, and phosphate groups.

The process of the instant invention is equally applicable to cationic type vehicle resins, that is, poly-bases solubilized by means of an acid, for example, an amine-terminated polyamide or an acrylic polymer solubilized with acetic acid. One such class of materials is described in British Pat. No. 1,132,267. Another case of such cationic polymers is described in copending Application Ser. No. 772,366, filed Oct. 28, 1968.

In a manner similar to the anionic resins described above, the cationic resins may be formulated with adjuvants, such as pigments, solvents, surfactants, crosslinking resins, and the like.

The polyacids are anionic in nature and are dispersed or dissolved in water with alkaline materials such as amines or alkaline metal hydroxides, and, when subjected to an electric current, they migrate to the anode. The poly-basic resins, solubilized by acids are cationic in character and when these resins are water dispersed or solubilized with an acid such as acetic acid, the material deposits on the cathode under an electric current.

The complex organic polyphosphoric ester acid anhydride may be incorporated either in the initial bath composition or may be incorporated into an electrodeposition bath when the need arises, either alone or in admixture with the make-up feed material utilized to replenish the solids electrodeposited from the bath. Generally, the phosphorous compound may be added by any convenient method.

The anhydride may be added as the anhydride; however, in some cases it is preferable to add the anhydride in an aqueous solution where it may be in the form of the acid or in the form of the salt of the water-soluble base. For example, the acid may be added as a salted base utilized to solubilize the electrodepositable composition; however, salts of other bases than those employed in the bath may be employed. The base may be any water-soluble amine or alkaline metal or alkaline earth metal hydroxide.

The optimum amount of the phosphorous compound added varies with the vehicle resin employed, the severity of the staining problem and the strength of the particular phosphorous compound employed. Obviously, the advantages of the process of the invention are achieved by employing an effective amount of stain-inhibiting phosphorous compound.

Generally, relatively small amounts of the phosphorus compound are effective. Usually, amounts between about 0.5 and 5 percent by weight based upon the weight of the vehicle resin are employed, although amounts as low as 0.20 or as high as 10 percent may be employed; however, higher amounts are usually unnecessary and, while they are effective for reducing staining, the presence of relatively large amounts may impart other difficulties.

The invention is further described in conjunction with the following examples, which are to be considered illustrative rather than limiting. All parts and percentages in the examples and throughout the specification are by weight unless otherwise specified.

EXAMPLE A

A maleinized tall oil fatty acid adduct was prepared by charging into a reaction vessel fitted with agitator, thermometer, inert gas inlet and reflux condenser, 15.7 parts of maleic anhydride and 45.6 parts of tall oil fatty acids. The air in the reactor was displaced with an inert gas blanket and the contents heated to 80° C. to melt the maleic anhydride. The reaction mixture was then agitated and heated slowly to about 225° C. for about two hours and at 260° C. for an additional hour. The reaction was held at 260° C. for an additional three hours. The reaction product had a viscosity of 5000 centipoises and an acid value determined in alcoholic KOH of 225.

EXAMPLE B

Into a reactor equipped with an agitator, thermometer and inert gas tube, reflux condenser and water trap were added 213.5 parts of Epon 104 (a condensation product of epichlorohydrin and Bisphenol A, having an epoxy equivalent of 870–1025 and an average molecular weight of 1900), 149.5 parts of tall oil fatty acid and 4 parts xylene. The reaction mixture was heated with agitation and slow inert gas sparge to 250° C. and held to an acid value of approximately 5 was reached. Water of reaction was collected. The reaction mixture was then vigorously sparged with inert gas to remove the xylene and cooled to 150° C. There was then added 110.6 parts of the maleinized adduct of Example A. The reaction mixture was heated to 145° C. and held at that temperature for one hour. The reaction product was then diluted with 116.2 parts of a monoethyl ether of ethylene glycol (Cellosolve). The final product had a viscosity of 33,000 centipoises and an acid value in alcoholic KOH of 45 at 90 percent solids.

EXAMPLE I

A pigment dispersion was prepared by sand milling the following composition to a No. 7 Hegman fineness reading:

|  | Parts by Weight |
|---|---|
| Resin of Example B | 70.00 |
| Triethylamine | 5.60 |

The above were thoroughly mixed and then there was added, with agitation:

| Deionized water | 62.50 |
|---|---|

After mixing, there was added:

|  | Parts by Weight |
|---|---|
| Titanium dioxide | 42.50 |
| Strodex P-100* | 5.70 |
| Triethylamine | 4.30 |

*A commercially available complex organic polyphosphoric ester acid anhydride prepared in accordance with U.S. Pat. No. 3,380,927 with a molecular weight of 1040 and a neutralization equivalent of 240.

(The last two items above were mixed together before adding). After sand-milling the mill was washed with 20 parts of deionized water.

A primer was prepared as follows:
The following were mixed in order:

| | |
|---|---|
| Resin of Example B | 389.00 |
| Triethylamine | 30.20 |
| Hexamethoxymethyl melamine (heated to 130° F. before adding) | 40.70 |
| Deionized water | 284.30 |

To this composition after thorough mixing was added 310.60 parts of the paste formed above. After thorough mixing, the composition was reduced to 10 percent solids with deionized water.

An electrodepositable coating formulated as above with the exception that the phosphorous compound was omitted showed severe staining after several turnovers, coating on iron phosphatized steel (60 sec., 200 volts, 75° F. bath temperature). Staining was apparent in the form of blotchiness or uneven coloring.

The electrodepositable composition containing the phosphorous compound formulated as described above, under the same conditions described immediately above provided coatings which were substantially stain free.

Various other electrodepositable compositions, such as those hereinabove described, can be substituted for those of the examples. In the above and other tests, the general applicability of the composition and methods herein have been shown and it has been found that good results are attained using varying compositions, electrodeposition conditions and substrates.

According to the provisions of the patent statutes, there are described above the invention and what are now considered its best embodiments. However, within the scope of the appended claims, it is to be understood that the invention can be practiced otherwise than as specifically described.

We claim:

1. In a process for the electrodeposition of a coating upon an iron-containing, electrically-conductive article by an electrodeposition process, the improvement comprising employing a the electrodeposition bath a composition comprising an aqueous dispersion comprising an ionically-solublized synthetic organic vehicle resin, said bath containing a stain-inhibiting amount of a coester of (1) a phosphorous compound selected from the group consisting of phosphorous pentoxide, orthophosphoric acid and polyphosphoric acid, (2) an aliphatic monohydric alcohol containing from 6 to 16 carbon atoms, and (3) a non-ionic adduct of ethylene oxide and an organic compound selected from the group consisting of alkylated phenols containing at least one alkyl group of 6 to 18 carbon atoms, aliphatic alcohols containing from 6 to 25 carbon atoms, aliphatic monocarboxylic acids containing from 6 to 20 carbon atoms, and aliphatic mercaptans containing 7 to 20 carbon atoms, said non-ionic adduct (3) containing from 1 to 40 moles of ethylene oxide per mole of said organic compound, and being present in the weight proportions of about 5 to about 85 parts per 100 parts combined of said non-ionic adduct (3) and said aliphatic monohydric alcohol (2), and the molar ratio of the total number of moles combined of said aliphatic monohydric alcohol (2) and of said non-ionic adduct (3) to the total number of moles of said phosphorous compound (1), calculated as phosphorous pentoxide, being within the range of from about 1:1 to about 5:1.

2. A method as in claim 1 wherein the resin is a base-solubilized synthetic carboxylic acid.

3. A method as in claim 1 wherein the resin is an acid-solubilized synthetic organic polybasic resin.

4. A method as in claim 1 wherein the electrodeposition bath comprises an aqueous dispersion comprising:
   (A) a vehicle resin which is a mixed partial ester of a resinous polyol, containing free carboxyl groups, said resinous polyol having a molecular weight between about 500 and about 5000, said polyol having a portion of its hydroxyl groups esterified with a fatty acid and at least a portion of the remaining hydroxyl groups esterified with an unsaturated fatty acid-alpha, beta-ethylenically unsaturated dicarboxylic acid anhydride adduct, said adduct forming the ester through the anhydride ring of said adduct;
   (B) said vehicle being neutralized in said aqueous dispersion with sufficient water-soluble base to maintain said vehicle resin (A) in dispersion; and
   (C) said bath containing a stain-inhibiting amount of a coester of (1) a phosphorous compound selected from the group consisting of phosphorous pentoxide, ortho-phosphoric acid and polyphosphoric acid, (2) an aliphatic monohydric alcohol containing from 6 to 16 carbon atoms, and (3) a non-ionic adduct of ethylene oxide and an organic compound selected from the group consisting of alkylated phenols containing at least one alkyl group of 6 to 18 carbon atoms, aliphatic alcohols containing from 6 to 25 carbon atoms, aliphatic monocarboxylic acids containing from 6 to 20 carbon atoms, and aliphatic mercaptans containing 6 to 20 carbon atoms, said non-ionic adduct (3) containing from 1 to 40 moles of ethylene oxide per mole of said organic compound, and being present in proportions of about 5 to about 85 parts per 100 parts combined of said non-ionic adduct (3) and said aliphatic monohydric alcohol (2), and the molar ratio of the total number of moles combined of said aliphatic monohydric alcohol (2) and of said non-ionic adduct (3) to the total number of moles of said phosphorous compound (1), calculated as phosphorous pentoxide, being within the range of from about 1:1 to about 5:1.

5. A method as in claim 4 wherein the resinous polyol has a molecular weight between about 1000 and about 3000.

6. A method as in claim 5 wherein the polyol is selected from the group consisting of:
   (A) an epoxy resin which is the reaction product of a polyhydric phenol corresponding to the formula:

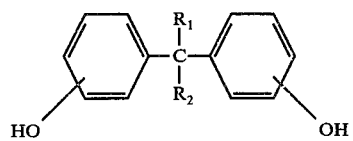

where $R_1$ and $R_2$ are selected from the group consisting of hydrogen and lower alkyl and an epihalohydrin, and
   (B) a styrene-allyl alcohol copolymer having the repeating structure:

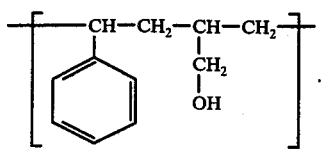

7. A method as in claim 1 wherein the electrodeposition bath comprises:
(A) a vehicle resin which is a mixed partial ester of a resinous polyol, containing free carboxyl groups, said resinous polyol having a molecular weight between about 500 and 5000, said polyol having a portion of its hydroxyl groups esterified with a fatty acid and at least a portion of the remaining hydroxyl groups esterified with an unsaturated fatty acid-maleic anhydride adduct, said adduct forming the ester through the anhydride ring of said adduct;
(B) said vehicle resin being neutralized in said aqueous dispersion with sufficient water-soluble base compound to maintain said vehicle resin (A) in dispersion; and
(C) said bath containing at least about one percent of a coester of (1) a phosphorous compound selected from the group consisting of phosphorous pentoxide, orthophosphoric acid and polyphosphoric acid, (2) an aliphatic monohydric alcohol containing from 6 to 16 carbon atoms, and (3) a non-ionic adduct of ethylene oxide and an organic compound selected from the group consisting of alkylated phenols containing at least one alkyl group of 6 to 18 carbon atoms, aliphatic alcohols containing from 6 to 25 carbon atoms, aliphatic monocarboxylic acids containing from 6 to 20 carbon atoms, and aliphatic mercaptans containing 6 to 20 carbon atoms, said non-ionic adduct (3) containing from 1 to 40 moles of ethylene oxide per mole of said organic compound, and being present in weight proportions of about 5 to about 95 parts per 100 parts combined of said non-ionic adduct (3) and said aliphatic monohydric alcohol (2), and the molar ratio of the total number of moles combined of said aliphatic monohydric alcohol (2) and of said non-ionic adduct (3) to the total number of moles of said phosphorous compound (1) calculated as phosphorous pentoxide, being within the range of from about 1:1 to about 5:1.

* * * * *

UNITED STATES PATENT AND TRADEMARK OFFICE
CERTIFICATE OF CORRECTION

PATENT NO. : 4,083,762

DATED : April 11, 1978

INVENTOR(S) : Myron J. Krupp, Gerald R. Gacesa and John P. Knudtson

It is certified that error appears in the above-identified patent and that said Letters Patent are hereby corrected as shown below:

Column 4, line 27, "produces" should be --products--.

Column 6, line 2, "arcylic" should be --acrylic--.

Column 11, line 40, "a" (first occurrence) should be --as--.

Signed and Sealed this

Fifth Day of September 1978

[SEAL]

Attest:

RUTH C. MASON
*Attesting Officer*

DONALD W. BANNER
*Commissioner of Patents and Trademarks*